United States Patent [19]

Norgaard

[11] Patent Number: 4,942,827
[45] Date of Patent: Jul. 24, 1990

[54] AUTOMOBILE DESK

[76] Inventor: Ronald Norgaard, 132 N. Prairie, Bloomingdale, Ill. 60108

[21] Appl. No.: 284,340

[22] Filed: Dec. 14, 1988

[51] Int. Cl.⁵ .......................... A47B 23/00; A47C 7/62
[52] U.S. Cl. .................................... 108/44; 297/188; 297/253; 297/135
[58] Field of Search ....................... 108/44, 45, 46, 47, 108/49, 25, 94, 139; 297/253, 252, 414, 144, 146, 188, 135; 224/42.43, 42.44, 275

[56] References Cited

U.S. PATENT DOCUMENTS

| | | | |
|---|---|---|---|
| 1,921,463 | 8/1973 | Graham | 108/46 |
| 2,934,391 | 4/1960 | Bohnett . | |
| 3,232,250 | 2/1966 | Hamilton et al. . | |
| 3,249,073 | 5/1966 | Gorham | 108/47 X |
| 3,338,629 | 8/1967 | Drees | 224/275 X |
| 3,345,118 | 10/1967 | Cummings . | |
| 3,922,973 | 12/1975 | Sturgeon | 108/44 X |
| 4,512,503 | 4/1985 | Gioso | 224/275 X |
| 4,575,149 | 3/1986 | Forestal et al. | 108/47 X |
| 4,577,788 | 3/1986 | Richardson . | |
| 4,790,440 | 12/1988 | Leszczak | 108/94 X |

Primary Examiner—Kenneth J. Dorner
Assistant Examiner—José V. Chen
Attorney, Agent, or Firm—Jerry T. Kearns

[57] ABSTRACT

A desk for use in an automobile has a base which is provided with adjustable spring urged retaining hook members for engagement with the bottom edge of the seat back portion of a conventional vehicle seat. The retaining hook members may be adjusted in selected extended positions for use with a wide variety of different configurations of conventional vehicle seats. The adjustable hook members comprise spring biased retaining flanges which, in a first position, may be easily inserted beneath the bottom edge of the automobile seat back portion. The retaining flanges are spring biased to a second position for clamping engagement with the vehicle seat back portion. The desk has an adjustable writing surface which may be pivoted about a vertical mounting post, for enabling occupants seated at either side of a vehicle to easily use the desk. A writing surface of the desk is formed by a slidable cover of a compartmentalized storage tray.

7 Claims, 4 Drawing Sheets

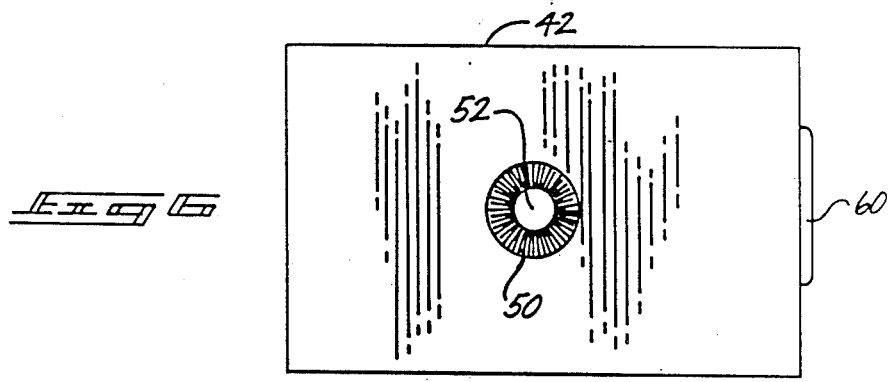
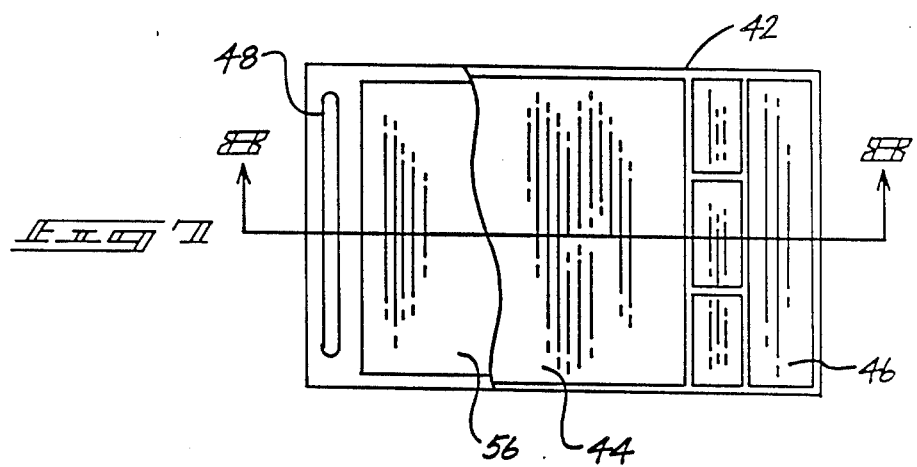
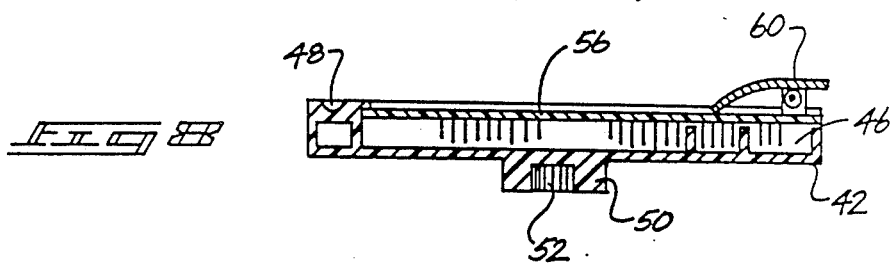

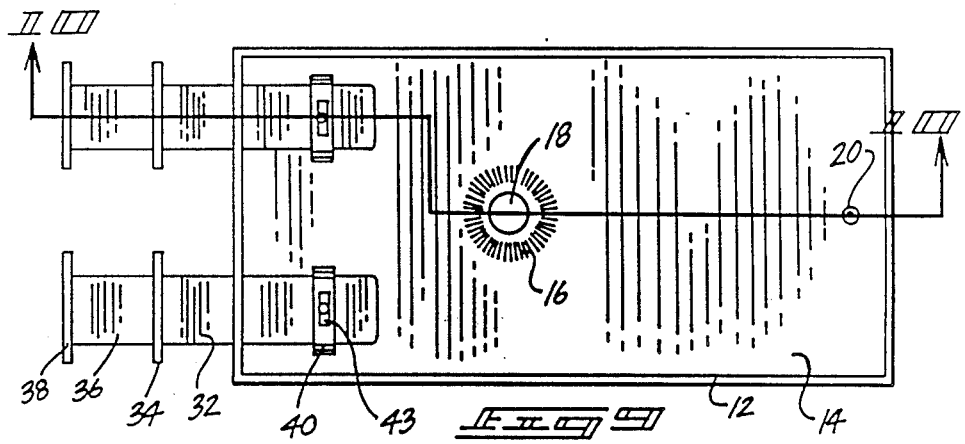
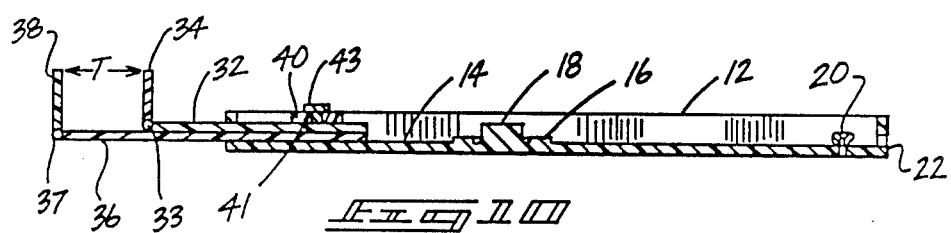
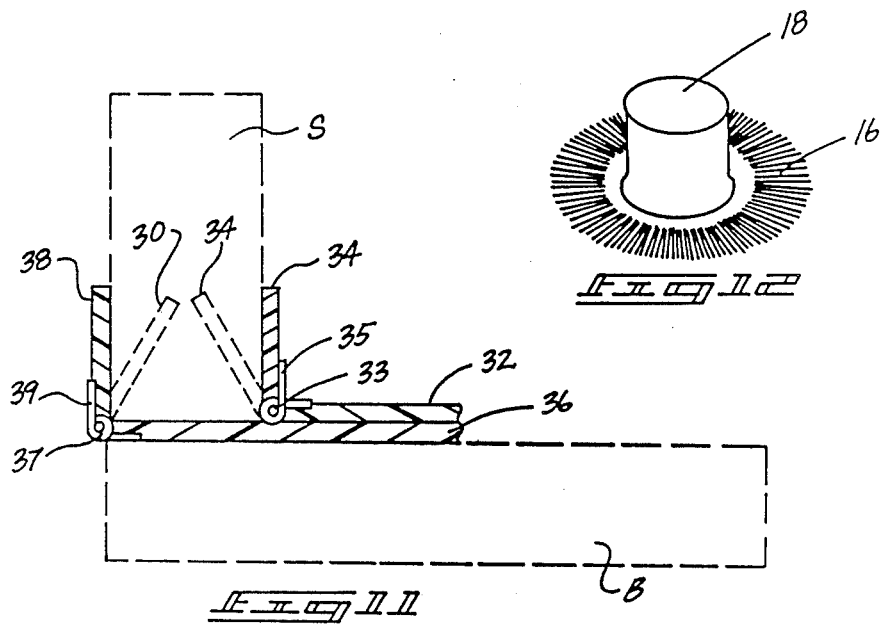

AUTOMOBILE DESK

BACKGROUND OF THE INVENTION

1. Field of the Invention

The present invention relates to automobile desks, and more particularly pertains to a new and improved automobile desk which may be adjustably retained by engagement with the seat back portion of a conventional vehicle seat. Many individuals, such as businessmen and policemen, require a desk adapted for use in the interior of an automobile. While many such automobile desks have been proposed in the prior art, there remains an unfilled need for a desk which may be quickly mounted in, and removed from, within an automobile. In order to fulfill this need, the present invention provides an improved automobile desk adapted for quick and convenient attachment to the seat back portion of a wide variety of conventional vehicle seats.

2. Description of the Prior Art

Various types of automobile desks are known in the prior art. A typical example of such an automobile desk is to be found in U.S. Pat. No. 2,934,391, which issued to F. Bohnett on Apr. 26, 1960. This patent discloses an automobile desk which is designed as a central console for engagement over the transmission hump of an automobile. U.S. Pat. No. 3,232,250, which issued to E. Hamilton et al on Feb. 1, 1966, discloses an automobile desk provided with a hooked frame portion for engagement over the top horizontal edge of a vehicle seat back portion U.S. Pat. No. 3,345,118, which issued to D. Cummings on Oct. 3, 1967, discloses an automobile desk which is constructed as a central console adapted for securement over the transmission hump of a vehicle. U.S. Pat. No. 3,922,973, which issued to H. Sturgeon on Dec. 2, 1975, discloses an automobile desk for use in vehicles which is provided with front and rear retaining hooks for engagement with a vehicle seat. The desk has a pivotally adjustable writing surface. U.S. Pat. No. 4,577,788, which issued to J. Richardson on Mar. 25, 1986, discloses an automobile desk for securement to the dashboard of a vehicle which has a hinged cover enclosing a compartmentalized storage tray.

While the above mentioned devices are suited for their intended usage, none of these devices disclose an automobile desk which utilizes a pair of extendable spring biased retaining hook members for engagement with the bottom edge of the back portion of a vehicle seat. Inasmuch as the art is relatively crowded with respect to these various types of automobile desks, it can be appreciated that there is a continuing need for and interest in improvements to such automobile desks, and in this respect, the present invention addresses this need and interest.

SUMMARY OF THE INVENTION

In view of the foregoing disadvantages inherent in the known types of automobile desks now present in the prior art, the present invention provides an improved automobile desk. As such, the general purpose of the present invention, which will be described subsequently in greater detail, is to provide a new and improved automobile desk which has all the advantages of the prior art automobile desks and none of the disadvantages.

To attain this, a representative embodiment of the concepts of the present invention is illustrated in the drawings and makes use of a base which is provided with adjustable spring urged retaining hook members for engagement with the bottom edge of the seat back portion of a conventional vehicle seat. The retaining hook members may be adjusted in selected extended positions for use with a wide variety of different configurations of conventional vehicle seats. The adjustable hook members comprise spring biased retaining flanges which, in a first position, may be easily inserted beneath the bottom edge of the automobile seat back portion. The retaining flanges are spring biased to a second position for clamping engagement with the vehicle seat back portion. The desk has an adjustable writing surface which may be pivoted about a vertical mounting post, for enabling occupants seated at either side of a vehicle to easily use the desk. A writing surface of the desk is formed by a slidable cover of a compartmentalized storage tray.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, maY readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile desk which has all the advantages of the prior art automobile desks and none of the disadvantages.

It is another object of the present invention to provide a new and improved automobile desk which may be easily and efficiently manufactured and marketed.

It is a further object of the present invention to provide a new and improved automobile desk which is of a durable and reliable construction.

An even further object of the present invention is to provide a new and improved automobile desk which is susceptible of a low cost of manufacture with regard to both materials and labor, and which accordingly is then susceptible of low prices of sale to the consuming public, thereby making such automobile desks economically available to the buying public.

Still yet another object of the present invention is to provide a new and improved automobile desk which provides in the apparatuses and methods of the prior art some of the advantages thereof, while simultaneously overcoming some of the disadvantages normally associated therewith.

Still another object of the present invention is to provide a new and improved automobile desk for use by businessmen, policemen and other individuals, within the interior of an automobile.

Yet another object of the present invention is to provide a new and improved automobile desk with provisions for securement to the bottom edge of the back portion of a conventional vehicle seat.

Even still another object of the present invention is to provide a new and improved automobile desk which utilizes adjustable, extendable, spring biased retaining hook members adapted for engagement with the bottom edge of the seat back portion of a conventional vehicle seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS The invention will be better understood and objects other than those set forth above will become apparent when consideration is given to the following detailed description thereof. Such description makes reference to the annexed drawings wherein:

FIG. 1 is an exploded perspective view of the automobile desk of the present invention. FIG. 2 is a side view of the automobile desk. FIG. 3 is a top view of the automobile desk. FIG. 4 is a back end view of the automobile desk. FIG. 5 is a front end view of the automobile desk. FIG. 6 is bottom view of the pivotally adjustable compartmentalized storage tray of the automobile desk.

FIG. 7 is a top view, partially cut away, illustrating the compartmentalized storage tray of the automobile desk.

FIG. 8 is a cross sectional view, taken along line 8—8 of FIG. 7, illustrating the construction of the compartmentalized storage tray of the automobile desk.

FIG. 9 is a top view of the base portion of the base portion of the automobile desk.

FIG. 10 is a cross sectional view, taken along line 10—10 of FIG. 9, illustrating the construction of the base portion of the automobile desk.

FIG. 11 is a cross sectional detail view, illustrating the spring biased retaining hook members of the automobile desk.

FIG. 12 is a perspective detail view illustrating the mounting post portion of the base of the automobile desk.

DESCRIPTION OF THE PREFERRED EMBODIMENT

Figure 1:
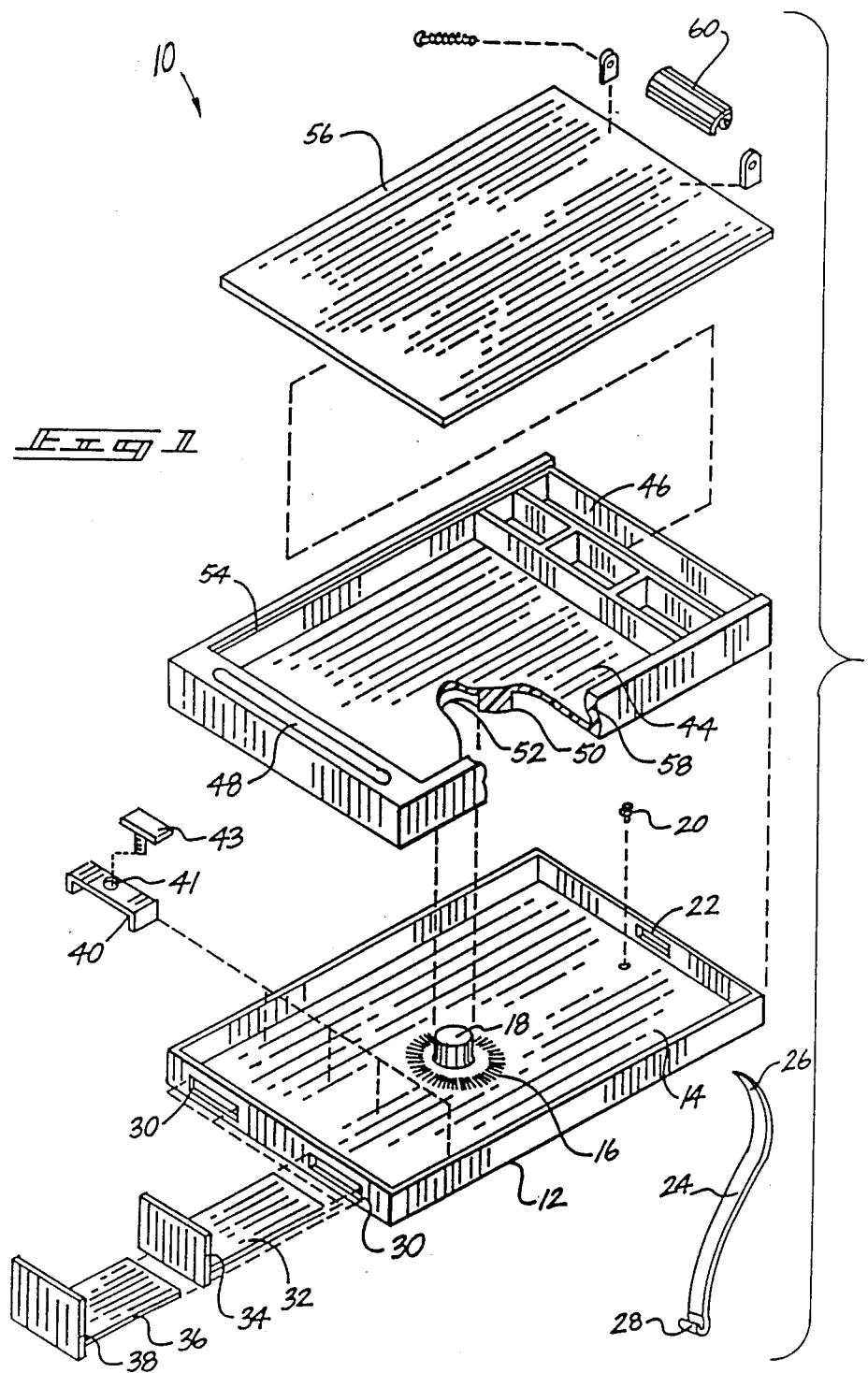

With reference now to the drawings, and in particular to FIG. 1 thereof, a new and improved automobile desk embodying the principles and concepts of the present invention and generally designated by the reference numeral 10 will be described.

More specifically, it will be noted that the first embodiment 10 of the invention includes a generally rectangular base 12 which is formed as a shallow rectangular box. The rectangular interior surface 14 of the base 12 is provided with a circular array of equally angularly spaced radially extending projections 16 which surround a vertically extending cylindrical mounting post 18. A threaded fastener 20 is received in a threaded aperture formed adjacent a front edge of the interior surface 14. The fastener 20 is utilized to secure a retaining strap 24 which extends through a slot 22 formed through the front end wall of the base 12. The fastener 20 extends through the aperture 26 adjacent one end of the strap 24. A U-shaped hook 28 is attached to an opposite end of the strap 24 for engagement with the frame of the seat bottom portion of a convention vehicle seat. The strap 24 is preferably formed from an elastic material. A pair of spaced rectangular slots 30 are formed in the back end wall of the base 12. A pair of extendable retaining members 32 and 36 are received in overlying relation through each of the slots 30. A clamping bracket 40 is secured to the interior surface 14 of the base 12, adjacent each of the slots 30. A clamping screw 43 extends through a threaded aperture 41 in the clamping bracket 40. BY tightening the screw 43 into frictional engagement with the retaining member 32, the retaining members 32 and 36 may be clamped in any desired extended position. Each of the extendible retaining members 32 and 36 are provided with a pivotal retaining flange portion 34 and 38, respectively A pivotal compartmentalized storage tray 42 is formed as a shallow, generally rectangular box. The tray 42 has an interior surface 44 which is divided into a plurality of individual compartments 46. An elongated pencil groove 48 is provided adjacent a back edge portion of the tray 42. A downwardly extending cylindrical boss 50 is formed on the bottom surface of the tray 42. The boss 50 has a central cylindrical recessed socket 52 for engagement with the mounting post 18 of the base 12. A slidable cover 56, which forms a planar writing surface, is mounted in parallel tracks 54 and 58 on opposite sides of the tray 42. A spring biased paper retaining clip 60 is attached adjacent a front edge on the top surface of the cover 56.

Figure 2:
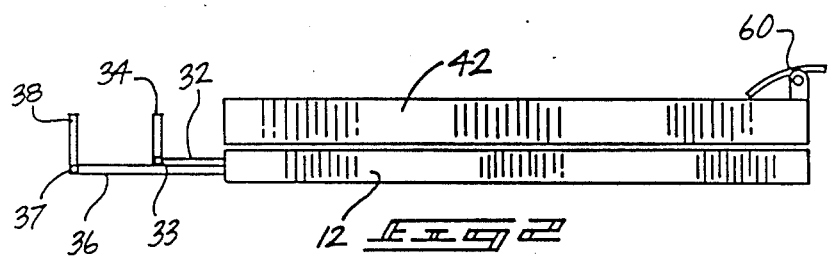

As illustrated in FIG. 2, each of the extendable retaining members 32 and 36 is secured to the respective retaining flanges 34 and 38 by hinge portions 33 and 37.

Figure 3:
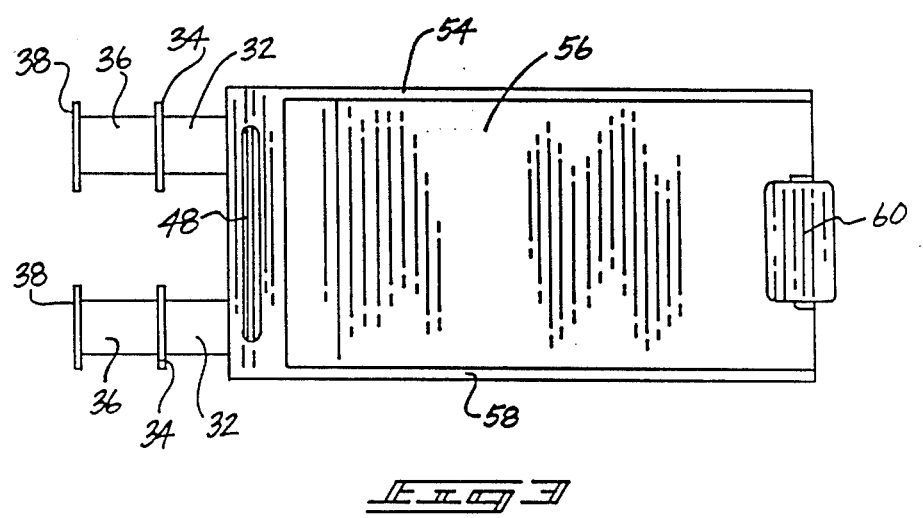

As shown in FIG. 3, two identical pair of retaining members 32 and 36 extend in spaced parallel relation from the back end wall of the base 12. In use, the bottom edge of the seat back portion of a conventional vehicle seat is received between the retaining flange members 34 and 38.

Figures 4, 5:
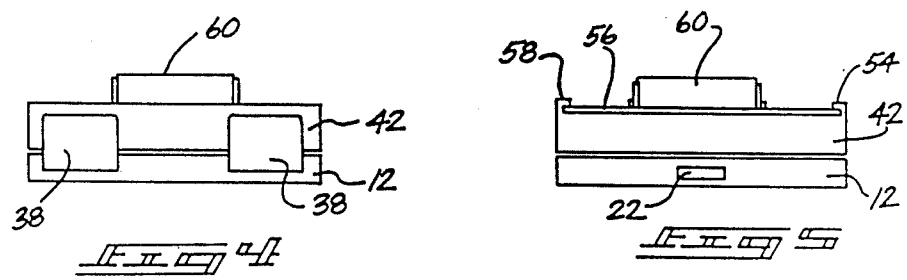

FIG. 4 depicts a back end view of the automobile desk of the present invention.

FIG. 5 depicts a front end view of the automobile desk of the present invention.

In FIG. 6, a bottom view of the tray 42 illustrates the downwardly extending cylindrical boss 50. The end face of the boss 50 has a circular array of equally angularly spaced radial recesses which surround the socket 52. In use, the mounting post 18 (FIG. 1) of the base 12 is received within the socket 52 and the projections 16 surrounding the post are received in mating engagement with the recesses on the boss 50. This allows the tray 42 to be pivotally adjusted in angular increments about the vertical axis of the post 18.

FIG. 7 illustrates a top view, partially cut away, of the tray 42 and slidable cover 56.

FIG. 8 provides a cross sectional view which further illustrates the construction of the tray 42.

In FIG. 9, a top view of the base 12 is illustrated. As previously described, the extendable retaining members 32 and 36 are received in parallel overlying relation through slots formed through the back end wall of the base 12. The inner end portions of each of the retaining members 32 and 36 are received within a clamping bracket 40 which is secured to the inner surface 14 of the base 12. A clamping screw 43 allows the retaining members 32 and 36 to be clamped in a selected extended position. This allows the spacing of the retaining flange members 34 and 38 to be varied, to allow accommodation of seat back portions of various different thicknesses.

In FIG. 10, a cross sectional view of the base 12 illustrates the overlying relation of the retaining members 32 and 36. As may now be readily understood, the retaining members 32 and 36 may be slidingly adjusted relative to one another to vary the thickness T between the retaining flange members 34 and 38.

As illustrated in the cross sectional detail view of FIG. 11, the retaining flange 34 is secured to the retaining member 32 by a hinge 33. The retaining flange 34 is biased to the position illustrated in dotted lines by a spring 35. The retaining flange member 38 is similarly connected to the retaining member 36 by a hinge 37 and is biased by a spring 39 to the position illustrated in dotted lines. In use, the seat back portion S of a conventional vehicle seat is retained between the flanges 34 and 38. The spring bias of the flanges 34 and 38 provided a clamping engagement of the seat back portion S. However, the desk may be easily removed from engagement with the seat back portion S by pulling the base 12 forwardly in the direction indicated by the arrow. The retaining members 32 and 36 are received in the space between the horizontal top surface of the seat bottom portion B and the bottom edge of the seat back portion S. Thus, in use, the desk is supported on the horizontal upper surface of the seat bottom portion B.

In FIG. 12, a perspective detail view is provided which illustrates the cylindrical mounting post 18 of the base 12. The post 18 is surrounding by a circular array of radial projections 16.

The various components of the desk of the present invention are preferably formed from a molded plastic material. As is now apparent, the desk of the present invention may be easily mounted in, and removed from the interior of a vehicle, and is especially suitable for individuals who must work in the interior of a vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A desk adapted for use in an interior of a vehicle having a seat including a generally vertical seat back portion and a generally horizontal seat bottom portion, comprising:

base means dimensioned for support on a conventional vehicle horizontal seat bottom portion;

retaining hook means on said base means for engagement with a bottom edge of a conventional vehicle vertical seat back portion;

tray means;

pivotal mounting means pivotally mounting said tray means on said base means, said pivotal mounting means including a cylindrical post on one of said base means or said tray means and a cooperating socket on the other of said base means or said tray means;

a circular array of equally angularly spaced radially extending projections surrounding one of said post or said socket;

a circular array of equally angularly spaced radially extending recesses surrounding the other of said post or said socket; and said projections and said recesses in mating engagement.

2. The automobile desk of claim 1, wherein said tray means comprises a compartmentalized storage tray.

3. The automobile desk of claim 2, further comprising a cover having an upper planar writing surface, said cover slidably connected to said tray.

4. The automobile desk of claim 1, wherein said retaining hook means comprises at least one pair of retaining members extending in overlying relation through a back end wall of said base.

5. The automobile desk of claim 4, further comprising clamping means on said base for securing said retaining members in a selected extended position.

6. The automobile desk of claim 5, wherein said clamping means comprises a clamping bracket secured to said base means; and a clamping screw extending through said clamping bracket for frictional engagement with said retaining members.

7. The automobile desk of claim 4, further comprising a spring biased retaining flange pivotally attached adjacent an end portion of each of said retaining members.

* * * * *